(No Model.)
R. M. ROCKEY.
GARDEN IMPLEMENT.
No. 499,251. Patented June 13, 1893.
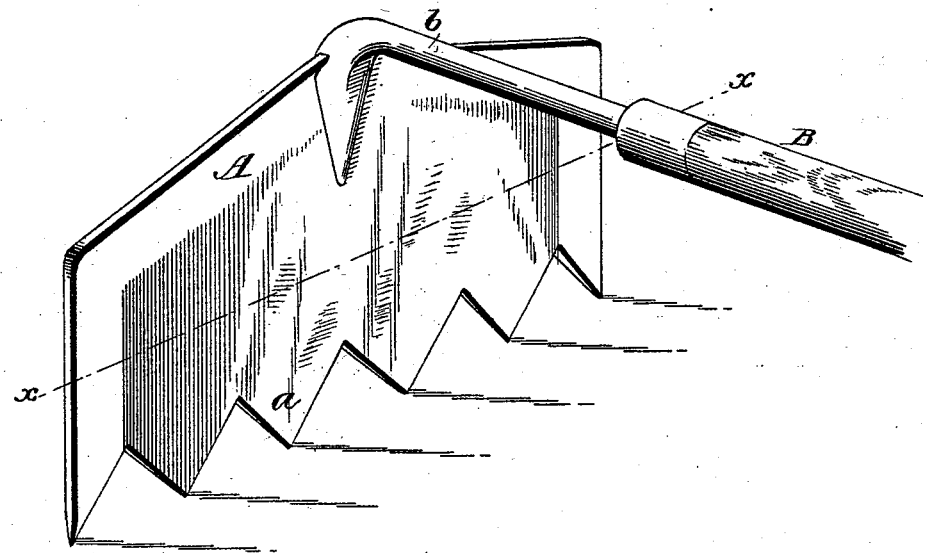
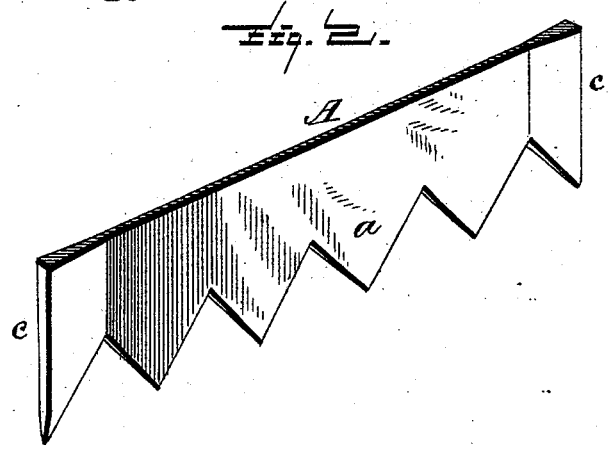
Witnesses
L. C. Hills.
G. W. Moore.
Inventor
Richard M. Rockey.
per Chas. H. Fowler
Attorney

UNITED STATES PATENT OFFICE.

RICHARD M. ROCKEY, OF NORA, ILLINOIS.

GARDEN IMPLEMENT.

SPECIFICATION forming part of Letters Patent No. 499,251, dated June 13, 1893.

Application filed January 28, 1893. Serial No. 459,998. (No model.)

*To all whom it may concern:*

Be it known that I, RICHARD M. ROCKEY, a citizen of the United States, residing at Nora, in the county of Jo Daviess and State of Illinois, have invented certain new and useful Improvements in Garden Implements; and I do hereby declare that the following is a full, clear, and exact description of the same, reference being had to the annexed drawings, making a part of this specification, and to the letters of reference marked thereon.

The present invention has relation to that class of garden implements such as hoes, spades, shovels, or those tools or implements having a cutting edge. The side edges of this class of implements are subject to more wear than other portions and the object of the invention is to make suitable provision for this wear, which object is attained by the construction substantially as shown in the drawings and hereinafter described and claimed.

Figure 1 of the drawings is a perspective view of a hoe embodying my invention; Fig. 2 a sectional perspective taken on line $x\ x$ of Fig. 1.

In the accompanying drawings I have shown the blade of a hoe as one of the garden implements to which my invention is applicable, the blade being shown at A and is provided with the usual shank $b$ to which is attached the handle B. The blade A is formed with teeth $a$ of any suitable depth and size which gives to the blade greater efficiency in destroying the weeds and loosening the soil. With the teeth on the blade the weeds can be cut nearer the plant with ease and without disturbing the roots of the plant and especially is this important in the cultivation of the soil.

It is well known that blades of this character are more subject to wear at their side or outer edges or corners than at the center of the blade, and to provide for this frictional wear, the blade is made of increased thickness at these points or gradually increases in thickness in a direction toward the side edges as indicated at $c$ in Fig. 2.

It is of course an advantage to have the teeth as thin as practicable without injuring their effectiveness and strength, but at the side or outer edges where it is subjected to increased wear, the blade must be strong and of sufficient thickness to compensate for such wear.

To further increase the strength of the blade around its entire outer edge, it may be of the same thickness as the side or outer edges, as shown in Fig. 1.

It should be understood that the invention is applicable to all classes of garden implements or those tools used to cultivate the soil, such as spades, shovels, and a similar class of devices.

Having now fully described my invention, what I claim as new, and desire to secure by Letters Patent, is—

A hoe or other garden implement having a blade provided with V-shaped teeth, said blade increasing in thickness in a direction toward its side and upper edges, substantially as and for the purpose set forth.

In testimony that I claim the above I have hereunto subscribed my name in the presence of two witnesses.

RICHARD M. ROCKEY.

Witnesses:
 DANIEL KELLY,
 JOSEPH B. WILSON.